(12) United States Patent
McArdle et al.

(10) Patent No.: US 10,068,383 B2
(45) Date of Patent: Sep. 4, 2018

(54) DYNAMICALLY DISPLAYING MULTIPLE VIRTUAL AND AUGMENTED REALITY VIEWS ON A SINGLE DISPLAY

(71) Applicant: DROPBOX, INC., San Francisco, CA (US)

(72) Inventors: Terrence Edward McArdle, San Francisco, CA (US); Benjamin Zeis Newhouse, San Francisco, CA (US); Amir Akbarzadeh, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 15/463,926

(22) Filed: Mar. 20, 2017

(65) Prior Publication Data

US 2017/0193709 A1 Jul. 6, 2017

Related U.S. Application Data

(63) Continuation of application No. 14/044,287, filed on Oct. 2, 2013.

(Continued)

(51) Int. Cl.
*G06T 19/00* (2011.01)
*G06F 3/0481* (2013.01)
(Continued)

(52) U.S. Cl.
CPC ............ *G06T 19/006* (2013.01); *G06F 3/011* (2013.01); *G06F 3/012* (2013.01); *G06F 3/017* (2013.01);
(Continued)

(58) Field of Classification Search
CPC . G06T 19/006; G06T 1/20; G06T 1/60; G06F 3/011; G06F 3/012; G06F 3/017;
(Continued)

(56) References Cited

U.S. PATENT DOCUMENTS 5,287,437 A 2/1994 Deering
5,745,126 A 4/1998 Jain et al.
(Continued)

FOREIGN PATENT DOCUMENTS

WO WO2008/107553 9/2008

OTHER PUBLICATIONS

U.S. Appl. No. 14/211,786, May 3, 2017, Office Action.
(Continued)

*Primary Examiner* — Chante Harrison
(74) *Attorney, Agent, or Firm* — Keller Jolley Preece (57) ABSTRACT

One variation of a method for dynamically displaying multiple virtual and augmented reality scenes on a single display includes determining a set of global transform parameters from a combination of user-defined inputs, user-measured inputs, and device orientation and position derived from sensor inputs; calculating a projection from a configurable function of the global transform parameters, context provided by the user and context specific to a virtual and augmented reality scene; rendering a virtual and augmented reality scene with the calculated projection on a subframe of the display; and repeating the previous two steps to render additional virtual and augmented reality scenes.

20 Claims, 2 Drawing Sheets

Related U.S. Application Data (60) Provisional application No. 61/709,141, filed on Oct. 2, 2012.

(51) Int. Cl.
  | | |
  |---|---|
  | *G06F 3/0485* | (2013.01) |
  | *G06F 3/01* | (2006.01) |
  | *G06F 3/03* | (2006.01) |
  | *G06F 3/0346* | (2013.01) |
  | *G06F 3/0488* | (2013.01) |
  | *G06T 1/20* | (2006.01) |
  | *G06T 1/60* | (2006.01) |

(52) U.S. Cl.
  CPC .......... *G06F 3/0304* (2013.01); *G06F 3/0346* (2013.01); *G06F 3/0485* (2013.01); *G06F 3/04815* (2013.01); *G06F 3/04883* (2013.01); *G06F 2203/04806* (2013.01); *G06T 1/20* (2013.01); *G06T 1/60* (2013.01)

(58) Field of Classification Search
  CPC .. G06F 3/0304; G06F 3/0346; G06F 3/04815; G06F 3/0485; G06F 3/04883; G06F 2203/04806; G09G 2340/0492
  USPC .......................... 345/7, 8, 629–635; 715/751
  See application file for complete search history.

(56) References Cited

U.S. PATENT DOCUMENTS

| | | | |
|---|---|---|---|
| 5,841,439 A | 11/1998 | Ronald et al. | |
| 5,990,941 A | 11/1999 | Jackson et al. | |
| 6,226,669 B1 | 5/2001 | Huang et al. | |
| 6,389,179 B1 | 5/2002 | Katayama et al. | |
| 6,760,026 B2 | 7/2004 | Li et al. | |
| 7,133,068 B2 | 11/2006 | Fisher et al. | |
| 7,136,090 B1 | 11/2006 | McDuffie White | |
| 7,224,326 B2 | 5/2007 | Sefton | |
| 7,389,591 B2 | 6/2008 | Jaiswal et al. | |
| 7,424,218 B2 | 9/2008 | Baudisch et al. | |
| 7,499,586 B2 | 3/2009 | Agarwala et al. | |
| 7,564,469 B2 | 7/2009 | Cohen | |
| 7,688,346 B2 | 3/2010 | Richards | |
| 8,041,574 B2 | 10/2011 | Yano | |
| 8,144,232 B2 | 3/2012 | Larson et al. | |
| 8,154,634 B2 | 4/2012 | Fukumoto | |
| 8,301,159 B2 | 10/2012 | Hamynen et al. | |
| 8,373,573 B2 | 2/2013 | Chou et al. | |
| 8,384,718 B2 | 2/2013 | Dahlke | |
| 8,698,902 B2 | 4/2014 | Kawamoto et al. | |
| 8,730,156 B2 | 5/2014 | Weising et al. | |
| 8,907,983 B2 | 12/2014 | McArdle et al. | |
| 8,953,022 B2 | 2/2015 | McArdle et al. | |
| 9,017,163 B2 | 4/2015 | Newhouse et al. | |
| 9,041,743 B2 | 5/2015 | McArdle et al. | |
| 9,070,219 B2 | 6/2015 | McArdle et al. | |
| 9,118,970 B2 | 8/2015 | Newhouse et al. | |
| 9,223,408 B2 | 12/2015 | McArdle et al. | |
| 9,271,025 B2 | 2/2016 | McArdle et al. | |
| 2001/0030693 A1 | 10/2001 | Fisher et al. | |
| 2002/0140666 A1 | 10/2002 | Bradski | |
| 2002/0158873 A1 | 10/2002 | Williamson | |
| 2003/0065668 A1 | 4/2003 | Sowizral et al. | |
| 2003/0174136 A1 | 9/2003 | Emberling et al. | |
| 2004/0027330 A1 | 2/2004 | Bradski | |
| 2005/0219239 A1 | 10/2005 | Mashitani et al. | |
| 2005/0232507 A1 | 10/2005 | Zimmer | |
| 2005/0286125 A1 | 12/2005 | Sundstrom et al. | |
| 2006/0050140 A1 | 3/2006 | Shin et al. | |
| 2006/0082692 A1 | 4/2006 | Kamijima et al. | |
| 2006/0239525 A1 | 10/2006 | Katayama et al. | |
| 2007/0025723 A1 | 2/2007 | Baudisch et al. | |
| 2007/0035562 A1 | 2/2007 | Azuma et al. | |
| 2007/0076016 A1 | 4/2007 | Agarwala et al. | |
| 2007/0103543 A1 | 5/2007 | Anderson et al. | |
| 2007/0168418 A1 | 7/2007 | Ratnakar | |
| 2007/0236493 A1 | 10/2007 | Horiuchi et al. | |
| 2008/0042973 A1 | 2/2008 | Zhao et al. | |
| 2008/0071559 A1 | 3/2008 | Arrasvuori | |
| 2008/0082692 A1 | 4/2008 | Yano | |
| 2008/0094417 A1 | 4/2008 | Cohen | |
| 2008/0194323 A1 | 8/2008 | Merkli et al. | |
| 2008/0266326 A1 | 10/2008 | Porwal | |
| 2008/0280676 A1 | 11/2008 | Distanik et al. | |
| 2008/0292131 A1 | 11/2008 | Takemoto et al. | |
| 2008/0309508 A1 | 12/2008 | Harmon | |
| 2008/0320422 A1 | 12/2008 | Cazeaux | |
| 2009/0140887 A1 | 6/2009 | Breed et al. | |
| 2009/0237564 A1 | 9/2009 | Kikinis et al. | |
| 2009/0240431 A1 | 9/2009 | Chau et al. | |
| 2009/0244097 A1 | 10/2009 | Estevez | |
| 2009/0292774 A1 | 11/2009 | Box et al. | |
| 2010/0001980 A1 | 1/2010 | Kim et al. | |
| 2010/0002122 A1 | 1/2010 | Larson et al. | |
| 2010/0007657 A1 | 1/2010 | Rurin | |
| 2010/0066763 A1 | 3/2010 | Macdougall et al. | |
| 2010/0092079 A1 | 4/2010 | Aller | |
| 2010/0125816 A1 | 5/2010 | Bezos | |
| 2010/0161658 A1 | 6/2010 | Hamynen et al. | |
| 2010/0169837 A1 | 7/2010 | Hyndman | |
| 2010/0171758 A1 | 7/2010 | Maassel et al. | |
| 2010/0188397 A1 | 7/2010 | Tsai et al. | |
| 2010/0208033 A1 | 8/2010 | Edge et al. | |
| 2010/0214111 A1 | 8/2010 | Schuler et al. | |
| 2010/0228633 A1 | 9/2010 | Stella et al. | |
| 2010/0287485 A1 | 11/2010 | Bertolami et al. | |
| 2011/0041060 A1 | 2/2011 | Chien et al. | |
| 2011/0069229 A1 | 3/2011 | Lord | |
| 2011/0090252 A1 | 4/2011 | Yoon et al. | |
| 2011/0164116 A1 | 7/2011 | Gay et al. | |
| 2011/0201362 A1 | 8/2011 | Bregman-Amitai et al. | |
| 2011/0213861 A1 | 9/2011 | Fanelli et al. | |
| 2011/0216060 A1 | 9/2011 | Weising | |
| 2011/0234631 A1 | 9/2011 | Kim et al. | |
| 2011/0242134 A1 | 10/2011 | Miller et al. | |
| 2011/0248987 A1 | 10/2011 | Mitchell | |
| 2011/0273451 A1 | 11/2011 | Salemann | |
| 2012/0026166 A1 | 2/2012 | Takeda et al. | |
| 2012/0105440 A1 | 5/2012 | Lieberman et al. | |
| 2012/0105483 A1 | 5/2012 | Fedorovskaya et al. | |
| 2012/0113264 A1 | 5/2012 | Moshrefi et al. | |
| 2012/0194553 A1 | 8/2012 | Osterhout et al. | |
| 2012/0212405 A1 | 8/2012 | Newhouse et al. | |
| 2012/0214590 A1 | 8/2012 | Newhouse et al. | |
| 2012/0246223 A1 | 9/2012 | Newhouse et al. | |
| 2013/0038609 A1* | 2/2013 | Tsai ..................... | G01C 21/20 345/419 |
| 2014/0019166 A1 | 1/2014 | Swanson et al. | |
| 2014/0092135 A1 | 4/2014 | McArdle et al. | |
| 2014/0267418 A1 | 9/2014 | McArdle et al. | |
| 2015/0201133 A1 | 7/2015 | Newhouse et al. | |
| 2015/0243085 A1 | 8/2015 | Newhouse et al. | |
| 2015/0356788 A1 | 12/2015 | Abe et al. | |
| 2017/0366758 A1 | 12/2017 | Newhouse et al. | |

OTHER PUBLICATIONS

U.S. Appl. No. 14/628,113, Apr. 13, 2017, Office Action.

Ducket, Jon, "Beginning HTML, XHTML, CSS, and JavaScript®," Dec. 30, 2009, Wrox, p. 234.

Easypano Holdings Inc, "Panoweaver 6.00 User Manual", Copyright Easypano Holdings Inc., date unknown, downloaded from http://web.archive.org/web/20090711113513/http://www.easypano.com/download/doc/pw600_manual.pdf with an archive.org verified date of Jul. 11, 2009, pp. 24-74.

Fauster, Loris, and T.U. Wien. "Stereoscopic techniques in computer graphics." Tu Wien (2007), 10 pages.

Hewlett Packard, "HP Photosmart R717 Digistal Camera with HP Instant Share User's Manual", Copyright 2005 Hewlett-Packard Development Company, L.P., downloaded from http://h10032.www1.hp.com/ctg/Manual/c00298985.pdf on May 3, 2013, pp. 50-54.

(56) References Cited

OTHER PUBLICATIONS

Hildenbrand, Jerry; "Yelp 2.0 brings monocle and checkins to it Android Client,"; located at http:/www.androidcentral.com/yelp-20-brings-monocle-andcheckins-its-android-client; Jul. 5, 2010; 10 pages.

Hwang et al. "Hand-held virtual reality: a feasibility study." Proceedings of the ACM symposium on Virtual reality software and technology. ACM, 2006.

Kanbara, Masayuki, et al. "A stereoscopic video see-through augmented reality system based on real-time vision-based registration." Virtual Reality, 2000. Proceedings. IEEE. IEEE, 2000, 8 pages.

"Motion Control Simulation Applet" http://ir.exp.sis.pitt.edu/res2/data/is/group5/. Archived on Sep. 1, 2006. Retrieved on Nov. 5, 2013 from <https://web.archive.org/web/20060901110520/http://ir.exp.sis.pitt.edu/res2/data/is/group5/>.

Parr62, Ben; "Easter Egg: Yelp Is the iPhone's First Augmented Reality App,"; located at https://web.archive.org/web/20090829094113/http://mashable.com/2009/08/2007/yelp-aug . . . ; Aug. 27, 2009; 10 pages.

"Rotations and Euler angles" http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.

U.S. Appl. No. 13/269,231, Nov. 8, 2013, Office Action.
U.S. Appl. No. 13/269,231, Aug. 1, 2014, Notice of Allowance.
U.S. Appl. No. 14/533,000, Mar. 5, 2015, Office Action.
U.S. Appl. No. 14/533,000, Jun. 11, 2015, Office Action.
U.S. Appl. No. 14/533,000, Aug. 12, 2015, Notice of Allowance.
U.S. Appl. No. 13/302,964, Jun. 10, 2013, Office Action.
U.S. Appl. No. 13/302,964, Feb. 11, 2014, Office Action.
U.S. Appl. No. 13/302,964, Aug. 14, 2014, Office Action.
U.S. Appl. No. 13/302,964, Feb. 6, 2015, Office Action.
U.S. Appl. No. 13/302,964, Mar. 30, 2015, Notice of Allowance.
U.S. Appl. No. 13/302,977, May 15, 2013, Office Action.
U.S. Appl. No. 13/302,977, Aug. 14, 2014, Office Action.
U.S. Appl. No. 13/302,977, Jan. 13, 2015, Notice of Allowance.
U.S. Appl. No. 14/668,915, Sep. 29, 2016, Office Action.
U.S. Appl. No. 14/668,915, Mar. 21, 2017, Notice of Allowance.
U.S. Appl. No. 13/347,273, Apr. 23, 2014, Office Action.
U.S. Appl. No. 13/347,273, Oct. 20, 2014, Notice of Allowance.
U.S. Appl. No. 14/582,017, Jun. 19, 2015, Office Action.
U.S. Appl. No. 14/582,017, Oct. 14, 2015, Notice of Allowance.
U.S. Appl. No. 14/582,017, Nov. 6, 2015, Notice of Allowance.
U.S. Appl. No. 13/411,347, Feb. 10, 2014, Office Action.
U.S. Appl. No. 13/411,347, Oct. 21, 2014, Office Action.
U.S. Appl. No. 13/411,347, May 19, 2015, Notice of Allowance.
U.S. Appl. No. 13/410,176, Jun. 21, 2013, Office Action.
U.S. Appl. No. 13/410,176, Mar. 20, 2014, Office Action.
U.S. Appl. No. 13/410,176, Aug. 22, 2014, Office Action.
U.S. Appl. No. 13/410,176, Mar. 3, 2015, Notice of Allowance.
U.S. Appl. No. 14/044,287, Aug. 19, 2015, Office Action.
U.S. Appl. No. 14/044,287, Feb. 5, 2016, Office Action.
U.S. Appl. No. 14/044,287, Jun. 30, 2016, Office Action.
U.S. Appl. No. 14/044,287, Dec. 6, 2016, Notice of Allowance.
U.S. Appl. No. 14/211,786, Oct. 23, 2015, Office Action.
U.S. Appl. No. 14/211,786, Jun. 1, 2016, Office Action.
U.S. Appl. No. 14/211,786, Jan. 5, 2017, Office Action.
U.S. Appl. No. 14/628,113, May 19, 2016, Office Action.
U.S. Appl. No. 14/628,113, Sep. 23, 2016, Office Action.
U.S. Appl. No. 14/628,113, Oct. 18, 2017, Office Action.

* cited by examiner

Figure 2

DYNAMICALLY DISPLAYING MULTIPLE VIRTUAL AND AUGMENTED REALITY VIEWS ON A SINGLE DISPLAY

CROSS-REFERENCE TO RELATED APPLICATIONS

The present application is a continuation of U.S. application Ser. No. 14/044,287, filed Oct. 2, 2013 and claims the benefit of U.S. Provisional Application Ser. No. 61/709,141, filed on Oct. 2, 2012. The contents of the foregoing applications are hereby incorporated by reference in their entirety.

TECHNICAL FIELD

This invention relates generally to the virtual and augmented reality field, and more specifically to a new and useful system and method for dynamically displaying multiple virtual and augmented reality scenes on a single display in the virtual and augmented reality field.

BACKGROUND

With the gaining popularity of mobile phones and mobile/tablet computers, virtual and augmented reality applications are becoming more approachable by the general public. However, as augmented and virtual realities become more widely accepted, there are numerous challenges to create and interface understandable and navigable by a wide variety of users. One aspect of virtual and augmented reality scenes is that it is difficult to represent the contents of a virtual and augmented reality scenes in a static display because a user's natural experience of a real scene is only in one direction with a fixed field of view. When multiple virtual and augmented reality scenes are present on a single display, the amount of visual information viewable in each scene is further limited. Thus, there is a need in the virtual and augmented reality field to create a new and useful system and method for dynamically displaying multiple virtual and augmented reality scenes on a single display. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
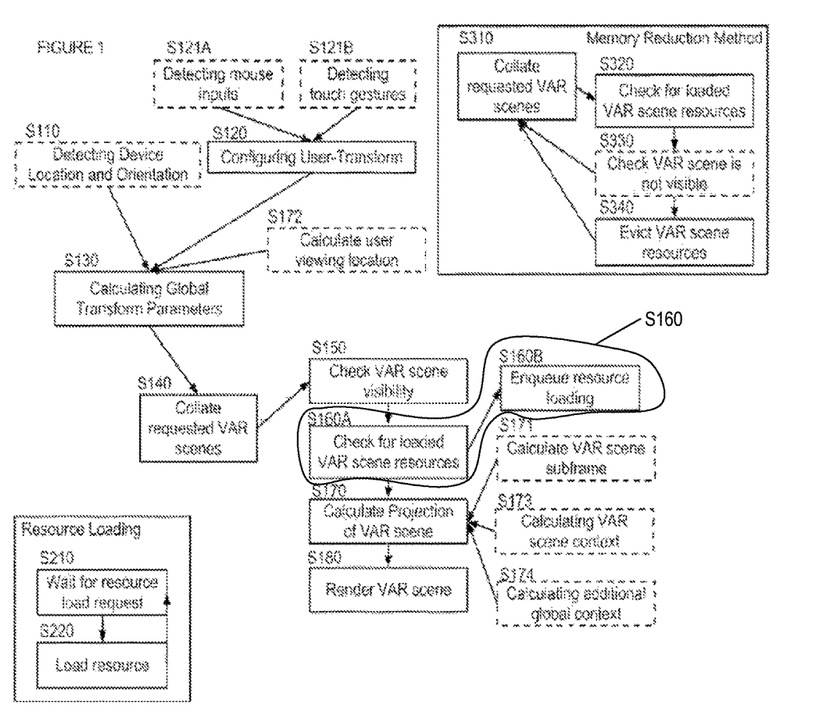
FIG. 1 is a schematic representation of a method of a first preferred embodiment of the invention.

As shown in FIG. 1, the method of a preferred embodiment includes the steps of detecting orientation and position of a computing device if possible S110, optionally determining a user's viewing location S172, determining a user-configured transform S120 through either mouse inputs S121A or touch gestures S121B, combining all transforms into a set of global transform parameters consisting of an orientation, a set of perspective projection parameter transforms and a viewer's location relative to the device shared across all VAR scenes S130, collating requested VAR scenes into a sequence to be drawn S140, checking whether the resources required for each VAR scene has been loaded S150 and if not enqueuing the resources to load on a background thread S160B, then checking whether the requested frame of the VAR scene is visible on screen S170 and if so calculating the projection of the VAR scene using a modular function S170 which can take as inputs a calculation of the VAR scene subframe on the display S171, a set of VAR scene-specific context S173, and any other additional global context S174. Once a projection has been calculated, the VAR scene is rendered to the requested frame S180. Separately, a concurrent method waits for a resource load request S210 and then loads the requested resource S220. In the situation where memory becomes constrained, an additional method collects requested VAR scenes S310, checks for which VAR scene resources have been loaded S320 and optionally whether the VAR scene is not visible within the device frame S330 and then evicts the resource from memory S340.

The virtual and augmented reality scene may consist of a 3D model, a partially or wholly spherical photo, digitally generated environment map, or other suitable model presentable in 3D space.

Step S110, which includes detecting orientation of a computing device functions to determine the orientation of the computing device. The computing device preferably includes an inertial measurement unit (IMU) that preferably includes a 3-axis magnetometer, a 3-axis accelerometer, or a 3-axis gyroscope. The IMU may alternatively include any suitable combination of the above components or a single or double axis sensor or any suitable sensor combination to detect orientation. Additionally, Step S110 may include detecting positioning location, which preferably provides another parameter for determining orientation and position. A global positioning system (GPS) can preferably be used to determine geographical location. Orientation information may be gathered in any suitable manner including device API's or through any suitable API exposing device orientation information such as using HTML5 to access device orientation or CoreMotion on an iOS platform or the equivalent on Android and Windows platforms. An imaging system may additionally be used to perform image processing on the surrounding environment. Preferably the image system is a forward or backward facing camera that can be used to determine the position of a user looking at the computing device. In the case where there are no suitable sensors, this step may represent the device orientation as the identity orientation. Optionally, device orientation can be disabled and Step S110 simply returns the identity orientation.

Step S120, which includes configuring user-transforms functions to allow the user to look at a specific portion of the virtual and augmented reality scene. This potentially includes combining multiple orientations from separate user inputs in whatever mathematical construction is chosen to represent orientation, including, but not limited to: rotation matrixes, euler angles (yaw, pitch, and roll) and quaternions. In combining these orientations an operator is applied in a specific order, typically, but not limited to, multiplication. Separately a set of transforms on the parameters of a perspective projection (including, but not limited to, field of view, aspect ratio, near plane, far plane, and frustum bounds (left, right, top, and bottom)) are maintained and modified by the user and then passed to step S130. Combining these transforms may use any suitable mathematical operator such as, but not limited to, multiplication, division, addition, and subtraction.

Step 121A functions to allow the user direct which direction the user is looking with a mouse cursor. Step 121A maps cursor movement to rotations. One preferable mapping is one in which that movement along the X-axis of the display introduces an orientation that is premultiplied with the orientation from step S110 in Step S130, representing rotation in yaw. Movement along the Y-axis of the display creates an additional orientation that is pre-multiplied with the orientation from S110 in Step S130, but only after the X-axis orientation is premultiplied, representing rotating in pitch. Preferably the rotation is mapped monotonically with movement along each access, including, but not limited to, a simple linear relationship. The bounds of this function can be either the frame of the device, the frame of a specific virtual and augmented reality scene, a frame specified by the user, or infinite in the case where the user interface paradigm allows pointer lock. Additional mouse inputs such as scrolling may be used to transform parameters of the perspective projections such as, but not limited to, field of view.

Step 121B, which includes configuring user-transform (consisting of an orientation and optionally a projection transform and optionally a positional offset) using touch gestures, functions to allow the user to manually position the VAR scene on a touch-screen device such as a phone, tablet or other handheld computer. One such gesture that may be used is a dragging gesture such that an orientation is calculated as if the user is looking from the center of a sphere out and dragging the sphere with the center of the sphere acting as a pivot point. In the case where the VAR scene is a spherical photograph, approximately the same point in the image should remain under the user's finger through the gesture. One such way to calculate such an orientation is to map each touch point to a vector out of the center of the screen along an orthonormal basis aligned with the existing global orientation provided in step S130. One preferable method of achieving this is calculating a vector in device space and then multiplying it with the global orientation provided in step S130. A preferable method of estimating the touch vector in device space, includes but not is not limited to, first calculating the x and y coordinates on screen either relative to the entire device frame or relative to a specific VAR scene frame and then combined with a field of view in a VAR scene is used to calculate x and y coordinates in normalized device coordinates, from which z can be derived as the magnitude of the orientation vector must be one. As the user moves their finger from the start point, the touch vector can be recalculated and a rotation can be derived between the start and current vector through typical dot and cross products or any other suitable mathematical construction. In another implementation, the user can be constrained to only allow rotations about the Z-axis by projecting the touch vectors onto the horizon plane (at Z=0) before calculating the rotation. Alternatively, one may switch the orientation from a drag to push model by simply reversing the orientation derived from the previous step calculated by determining the start and end touch vectors.

An additional gesture which may be included is one such that some subframe of the screen is mapped to yaw and pitch rotations similar to S121A, where instead of the cursor location defining the yaw and pitch, the touch event location is used instead.

An additional gesture which may be included is one such that the vector along which a user drags their finger can be interpreted as a vector in the orthonormal basis of the globally transformed orientation. A rotation can then be calculated that rotated the z-axis of the globally transformed orientation to align with the vector of the drag. This has the effect of aligning the horizon perpendicular to the direction of the dragged finger, which can be used to realign gravity in a more useful direction when the primary viewing direction is, for example, down in a real-world orthonormal basis.

An additional gesture which may be included is one such that as the user pinches to zoom the field of view property of a perspective transform is scaled monotonically.

An additional gesture which may be include is one in which double tapping decreases the field of view property of a perspective transform.

Any additional gestures not mentioned here that modify the orientation of VAR scene or parameters of a perspective projection are suitable for Step S121B.

Step S172 provides a method to optionally track the user's location relative to the device and display so that the in step S170, the user defined function can adapt the projection of the VAR scene so simulate the view through the VAR scene frame to the user's eye as if the VAR scene was behind the VAR scene frame in real life. Methods to do this include, but are not limited to head tracking, IR tracking, eye tracking, and using proximity sensors. The user's location can be stored in displacement from the device, absolute world coordinates, or any other suitable reference frame and coordinate system.

Step S130 provides a method to formulate the transforms provided in S110, S120 and S172 into a data structure that can be used as a parameter in the function used in Step S170 to calculate the individual perspective transforms for each VAR scene. Preferably this involves, but is not limited to, multiplying like transforms together, such as orientation and field of view scale such that the final set of parameters represents a single orientation, set of perspective transform parameters and user displacement relative to the device.

Step S140 involves collating all requested VAR scenes into a collection which functions as a draw list to the system graphics APIs. One preferred method involves, but is not limited to a global object in which the VAR scenes register with upon initialization. This may be implemented as a singleton or just as an object that is passed around the running execution context. Typically each VAR scene is represented as a view in each platform specific graphics API, for example, but not limited to a UIView subclass on iOS, a div or canvas element in HTML, and the corresponding technologies on Microsoft and Linux platforms.

Step S150 involves determining whether the VAR scene would be visible to the user. One preferred method involves checking whether the view's bounds are within the device's bounds, checking whether the view is part of the graphical interface at all, checking whether the view is hidden, checking whether the view is fully transparent, and checking whether the view would be fully obscured by other graphical elements. If the VAR scene is not visible to the user, then steps S160A, S170, and S180 needed to render the scene are skipped and the next VAR scene is processed.

Step S160A involves determining whether the resources required to render the VAR scene have been loaded into memory. One possible method is to maintain a set of resources for each individual VAR scene independently. A preferred method, however, is to maintain a shared set of resources for a group of VAR scenes. This minimizes redundancy as two separate scenes that require the same resources only require one instance of the resources rather than two. Additionally, this improves performance as it minimizes expensive context switches between multiple resource sets. In OpenGL, this corresponds to a single OpenGL context with a shared frame buffer object (FBO) and separate render buffer for each VAR scene.

In the case where it is not feasible to associate a shared resource context with multiple views (like in certain technologies such as Flash on a web page), all of the resources can be loaded into a single object corresponding to a view in the respective graphics API that is then moved around and drawn to update each specific VAR scene. In lieu of having more than one single active viewport, other viewports can be approximated by a static representation while they are not active. When a VAR scene is selected to be actively drawn, the projection function defined in Step S170 can interpolate between the static representation and the desired active representation. Any suitable method can be used for selecting which VAR scene should be active in a resource set, including but not limited to, touching or clicking a specific VAR scene or hovering over a specific VAR scene.

Step 160B is executed if a required resource is not loaded, and functions to add the resource is added to a queue to be loaded. So as to not slow down the rendering of the rest of the graphics subsystem, it is preferable (but not required) to load the required resource asynchronously in another thread. One implementation of this, of many possible, involves dispatching a block of work on a grand central dispatch queue to be executed in a background thread, that shares OpenGL context resources with the drawing thread through an OpenGL sharegroup. It may be beneficial to split up resource loading into priorities base on user demands or estimated load time so that something small, resource wise, can be drawn sooner than would be possible if the block of work to load it was behind a larger resource request. Practically, this may manifest itself as rendering low-resolution thumbnails rather than full resolution imagery in the case of photography. The delegation of priority can be delegated to either the producer or consumers of the queue.

Step 170 involves calculating the projection of the VAR scene using a combination of the global transform parameters, VAR scene context, the location of the VAR scene frame within the device frame, and other global context. This preferably involves utilizing either a shared function closure or a function or closure specific to each individual VAR scene.

In the common case, a shared function calculates a perspective matrix from the perspective parameters in the global transform parameters and then premultiplies this resulting matrix by orientation and translation from the global transform parameters (representing in a matrix conceptually similar to a View Matrix in OpenGL terminology) to achieve the final projection matrix. Generating the perspective matrix is preferably done through whichever mathematical model is suitable for a given rendering technology used in Step S180. With OpenGL, this is preferably, but not limited to, a function with a mathematical equivalence to gluPerspective or glFrustum, which take in field of view, aspect ratio, near plane, and far plane or left, top, bottom, right, near and far bounds parameters respectively. These methods typically involve, but are not required to involve, a transformation to from eye coordinates to homogeneous clip coordinates in a frustum. Other technologies will likely, but are not required to use similar mathematics, altered depending on where in the rendering pipeline the perspective divide occurs (if at all), the clipping model, and the depth precision or other technology-specific concerns. Any suitable mathematical model for a projection that simulates optical perspective may be used.

Other functions may require more parameters than just the global parameters, such as the position of the VAR scene frame relative to the device frame which can be calculated in Step S171 by performing whichever platform specific methods are needed to calculate the bounds of the view. On iOS platforms one can use methods to traverse the view hierarchy and get the absolute position, on HTML platforms, one may traverse the DOM hierarchy which can be combined with scroll offsets to calculate VAR scene frame relative to the display. Any suitable method may be used. Additional VAR scene context may be used, such as, but not limited to whether the intent of a specific VAR scene is to highlight a specific direction S173. This extra context may be sourced from memory, disk, network or any other suitable storage medium. Additional global context, may be used in this function S174, such as, but not limited to whether all VAR scenes should be frozen or not. This extra context may be sourced from memory disk, network or any other suitable storage medium or sensor input.

Figure 2:
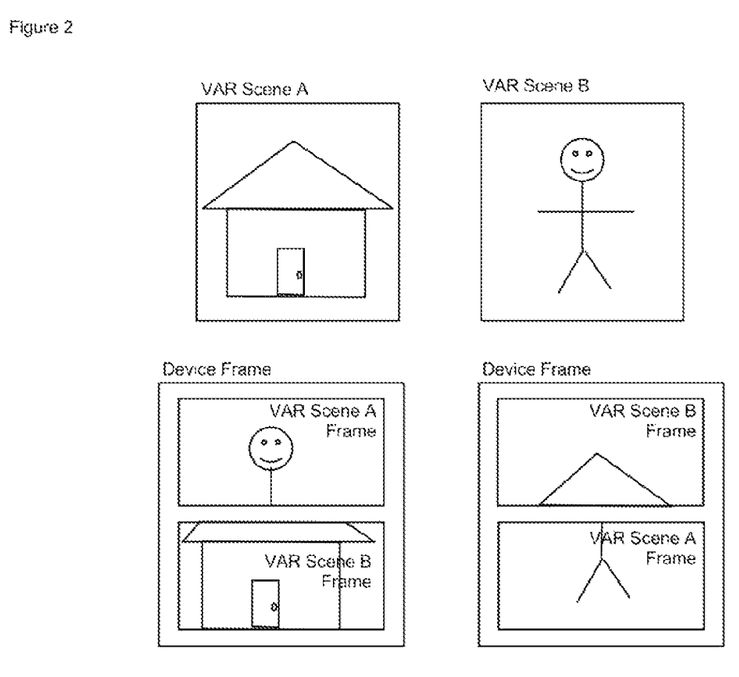
FIG. 2 is a representation of using the scene frame as a function to the projection calculation function.

Another possible function calculates an additional orientation based on the position of the VAR scene frame within the device frame which is then multiplied with the global orientation from the global transform parameters after which a perspective transform computed from the global transform parameters is multiplied. This additional orientation may be, but is not limited to being computed as a pitch rotation scaled according to the location of the VAR scene frame center along the vertical axis of the display (or in the case of a display without an obvious orientation along the axis pointing away from gravity). When a VAR scene is placed inside a scrollable view, scrolling the view up and down gives an effect similar to what it would be like to look through a lensed window. FIG. 2 depicts how swapping the frames of two VAR scenes with this function would change the resulting projection. Another possible function, which is more optically accurate, gives a similar effect which skews and modifies the perspective projection instead of using a rotation to simulate this effect.

Another possible function adjusts the field of view based on the position of the VAR scene frame within the device frame which is then multiplied with the global orientation from the global transform parameters after which a perspective transform computed from the global transform parameters is multiplied. This additional field of view scaling may be, but is not limited to being computed according to the location of the VAR scene frame center along the vertical axis of the display (or in the case of a display without an obvious orientation along the axis pointing away from gravity). In one of many possible configurations, when a VAR scene is placed inside a scrollable view, scrolling the view up and can give an effect, such as zooming in as the VAR scene center approached the center of the device frame and zooming out as the VAR scene center moves away from the center of the device frame. Alternatively, another method may use the distance from from the device to the user's viewing location to monotonically adjust the field of view, thereby simulating the effect of looking through a window.

Another possible function could be composed from any of the above functions where the device orientation is replaced with a statically defined orientation. This function could be used to highlight a specific portion of the VAR scene by locking the orientation to look in a specific direction.

Another possible function could be composed from any of the above function where the perspective component of the projection is skewed according to the displacement of the user's viewing location relative to the device.

Another possible function could be composed from any of the above functions with a programmed set of values such that as time progresses, the VAR scene results in a tour through the different aspects of a VAR scene.

Another possible function could select and compose any of the above functions depending on the context of the VAR scene being shown. For example, a user may deliver some input, such as but not limited to, tapping a button, that switches between a function that freezes orientation to one that uses the global orientation without modification. Such a function could transition between any other possible functions.

Step S180 involves using the projection calculated in S170 to render the VAR scene onto a display, framebuffer, or other suitable image storage location. This step preferably takes advantage of platform specific APIs such as OpenGL, Direct X, WebGL to render the 3D scene but any suitable rendering technology which supports perspective projections may be used. Preferably, this may occur on a thread separate from the thread that handles user interface events, but if a computer processing unit is fast enough more work can be done on the user interface thread.

After step S180 is complete, another VAR scene is chosen from the collection of requested VAR scenes and processed through steps S150, S160A/B, S170, S171, S173, S174, and S180 until all VAR scenes have been processed at which point the process repeats again from S110.

If the layout of a subset of VAR scenes permits a rendering multiple VAR scenes at once (for example, but not limited to, the scenario where a set of VAR scenes are intended to be rendered in a grid), then steps may be pipelined such that S150 is performed on a batch of VAR scenes before those VAR scenes go through Step S160A/B, etc. When possible this improves performance by reducing the amount of overhead the CPU wastes communicating with a graphics API such as OpenGL on the GPU.

Concurrently, two other submethods may be followed. One submethod is the resource loading method, which is designed to ensure consistent performance of the graphics rendering thread by offloading resource loading to an asynchronous background queue. This method may preferably be executed on a dispatch queue, but any other suitable concurrency mechanism such as, threads, processes, greenthreads, pre-emptive multitasking, multi-core or distributed computing may be used. Communication between this submethod and the graphics rendering thread may occur through any suitable mechanism such as synchronization with locks or semaphores, lock-free data structures, interprocess communication, message passing, shared memory, network sockets or any other suitable communication mechanism. Resources may be shared using any suitable memory sharing technology, preferably OpenGL sharegroups which allow for two separate OpenGL contexts on different threads to access the same set of resources such as textures and other resources.

Step S210 includes waiting for a resource load request to be processed. This can either be done through a queue or any other collection primitive. Preferably one may use a first in last out queue (FILO), which ensure that whatever the latest VAR scene to be added to the frame is rendered first. This is improves experience when a user is scrolling past large set of VAR scenes. When using a first in first out queue (FIFO), the user may have to wait for the intermediate bubbles that are off screen to finish loading before the VAR scenes currently on screen are loaded. Alternatively, if the queuing mechanism has an efficient means to cancel a resource load request, one may keep a FILO queue, certain queing technologies when combined with memory management can make it difficult to cancel a request, namely grand central dispatch on iOS platforms, without greatly added complexity.

Step S220 involves loading the specified resource, which can be either a texture, list of vertices, faces, triangles, shapes or other resource used in rendering a VAR scene. When possible, compressed formats which require little CPU decoding can be used to accelerate this process.

An additional submethod which may be required is one that reduces the memory consumed by the rendering method. In many scenarios where swap memory is to be avoided for performance or when there is no swap memory at all (such as on many mobile phones and tablets), the operating system or application may request that it minimizes the required memory footprint. This submethod involves collecting all of the VAR scenes, checking for which have loaded resources, optionally checking if they are not being drawn (and thus are safe to evict without impacting what is drawn on screen), and evicts each VAR scene's resources. This is can either be processed in-line with the rest of the drawing methods or asynchronously like resource loading.

Step S310 is identical to Step S140 in collating requested VAR scenes through either a global registry or other equivalent means.

Step 320 is identical to Step S160 in checking the implemented resource model for the presence of a specific resource, except in the case that the resource is not loaded in which case the next VAR scene is processed.

Step 330 is the inverse of Step S150 in that it checks that the VAR scene is not visible to the user. By only evicting invisible scenes, a suboptimal user experience from flickering VAR scenes resulting from quickly loading and unloading resources is avoided. However, the drawback is that the iteration through each VAR scene may take longer with this step included and may add complexity. Additionally, the operating system may require that more memory be released faster and thus it may be optimal to evict all resources and have them lazily loaded back in as they are requested to be drawn.

Step 340 consists of actually releasing the resources in whichever way is mandated by the graphics API. In OpenGL, for example, this means issuing a call to delete a texture Other implementation details remain around the memory management model. As VAR scene resources can be very large, particularly, when they are textures, it may be ill-fitting to rely on the garbage collection or built in reference counting schemes. Some reference counting schemes, for example, may delay deallocation or freeing of memory until there are spare CPU resources to do so, as a result, for example, scheduling can result in a very large resource being allocated before the old resource is deallocated. As a result, an implementation may, but is not required to, implement an additional explicit reference counting scheme which is guaranteed to deallocate a resource when a reference count reaches zero before the call to decrement the reference count for the last time returns.

The end result of this method (and submethods) is an experience in which it appears that a user interface has multiple 'live windows' into different virtual and augmented reality scenes that respond in a synchronized fashion to device movement and user input.

At a higher level of abstraction, this method provides a means to display a virtual and augmented reality scene that adjusts its own projection based on a set of globally defined parameters and interactions. As the number of scenes on screen increases this allows for easier manipulation as the interaction area of any individual virtual and augmented reality scene will likely shrink. With globally defined parameters and interactions, a user is not required to individually manipulate a virtual and augmented reality scene but instead can implicitly adjust many scenes shown on the display at once through global transformations on a larger interaction area (for example, the entire device screen).

The configurable function in Step S170 furthermore allows for an experience in which, in one possible implementation (of many), the user implicitly changes the projection of a VAR scene through some other traditional user interface interaction. One possible configuration is a configurable function which takes into account the position of the frame of the VAR scene on the display. As the user scrolls down, implicitly browsing through content, the method can be used to implicitly rotate each VAR scene along a specific axis thereby increasing the amount of a VAR scene the user sees while the VAR scene scrolls along across the screen as compared to if each projection was fixed. Another example is one such that as a VAR scene approaches the center of a display through scrolling, the VAR scene zooms in to highlight a specific portion of the scene and then zooms back out as it scrolls again off screen. This has the effect of not only showing the context but also highlighting a specific area by taking advantage of the existing and traditional user input control of scrolling. Thus, as demonstrated by this configuration, this method may be used to enable the user to experience a dynamic VAR scene by building onto existing user interface paradigms without requiring additional interactions, although still allowing them.

A method for dynamically displaying multiple virtual and augmented reality scenes on a single display of another preferred embodiment may include: determining a set of global transform parameters from a combination of user-defined inputs, user-measured inputs, and device orientation and position derived from sensor inputs; calculating a projection from a configurable function of the global transform parameters, context provided by the user and context specific to a virtual and augmented reality scene; and rendering a virtual and augmented reality scene with the calculated projection on a subframe of the display; and repeating the previous two steps to render additional virtual and augmented reality scenes.

The method may additionally or alternatively include wherein detecting orientation from orientation sensor inputs comprises detecting a rotation matrix from a gyroscope, magnetometer and/or accelerometer.

The method may additionally or alternatively include wherein user-defined transform comprises a rotation composed partially of a rotation around the gravity vector of the virtual and augmented reality scene. The rotation around the gravity vector may be derived from a user dragging a finger along a vector perpendicular to the gravity vector.

The method may additionally or alternatively include wherein the transform is partially composed from a zooming gesture used to transform the field of view. The user's dragging accumulated momentum may continue to adjust the rotation around the gravity vector after the user has stopped touching the device.

The method may additionally or alternatively include wherein user-defined orientation comprises a rotation composed partially of a rotation defined as the rotation that aligns the gravity vector of the virtual and augmented reality scene with a vector parallel to the surface of the device. The vector parallel to the surface of the device may be derived from a gesture in which the user drags across the device. The vector parallel to the surface of the device may alternatively be derived from the vector through the center of the display to another point on a display. The vector parallel to the surface of the device may alternatively be derived from the vector through the center of a virtual and augmented reality scene frame.

The method may additionally or alternatively include wherein the user-defined orientation comprises a rotation composed by a yaw and pitch mapped to a cursor location or touch event location along the x and y axis within a subframe of the display. The subframe of the display may be the entire display. The subframe of the display may be the frame of the current VAR scene under the cursor.

The method may additionally or alternatively include wherein the user-measured input consists of the location of the primary user's head relative to the display. The proximity of the primary user's head relative to the display may scale the field of view of the projection of the virtual and augmented reality scene. The location of the user's head relative to the display may translate the near plane and far planes of the frustum along their respective depth planes. The location of the user's head relative to the display may rotate the orientation of the projection along yaw and pitch corresponding to horizontal and vertical displacement.

The method may additionally or alternatively include wherein the additional context is a location of the virtual and augmented reality scene frame within the frame of the device. When the virtual and augmented reality scene frame is within a scrollable view and calculating the projection is re-calculated dynamically as the container scrollable view is scrolled. The location of the center of the frame along the vertical axis may adjust the vertical pitch of the projection of the virtual and augmented reality scene. The location of the center of the frame along the vertical axis may scale the field-of-view of the projection of the virtual and augmented reality scene. The location of the center of the frame along the vertical axis skews may translate the near and far planes of the projection frustum vertically along the bounds of the frame of the virtual and augmented reality scene.

The method may additionally or alternatively include wherein the additional context provides a fixed projection that causes the projection calculation to ignore portions of the global transform.

The method may additionally or alternatively include wherein the projection calculation function is dynamically software defined.

The method may additionally or alternatively include wherein multiple virtual and augmented reality scenes share one global resource context but maintain individual render targets. The rendering of virtual and augmented reality scenes may occur on separate threads separate from whichever thread that handles user input. The rendering of virtual and augmented reality scenes may maintain separate concurrent queues for loading resources of different resolutions. The rendering of virtual and augmented reality scenes to the target render buffer may be contingent on the scene frame being within the bounds of the device frame. When requested, the global resource context may reduce its memory consumption by purging all resources not currently being drawn on-screen. Multiple virtual and augmented reality scenes may be rendered in one call to the graphics processor by simulating multiple render targets with a single render target and an alpha mask. Individual render targets may be represented as independent objects subclassing platform specific user interface components, which are drawn to sequentially individually or in batches by a globally shared draw loop.

The method may additionally or alternatively include wherein multiple virtual and augmented reality scene share one global resource context and share a single render target that is moved throughout a user interface as drawing is needed. Virtual and augmented reality scenes which have projections which are not actively being updated may be replaced with a static approximation of each respective projection.

An alternative embodiment preferably implements the above methods in a computer-readable medium storing computer-readable instructions. The instructions are preferably executed by computer-executable components preferably integrated with a VAR rendering system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for dynamically displaying multiple virtual and augmented reality ("VAR") views on a single display, the method comprising:
   determining an orientation and position of a device based on sensor inputs;
   rendering a first VAR view with a first projection within a first subframe of a single display, wherein the first projection is based on the orientation and position of the device and a position of the first subframe on the single display;
   rendering a second VAR view with a second projection within a second subframe of the single display, wherein the second projection is based on the orientation and position of the device and a position of the second subframe on the single display;
   displaying the first and second VAR views simultaneously on the single display; and
   based on a change of the orientation and position of the device, simultaneously adjusting the display of the first VAR view and the second VAR view.

2. The method of claim 1, further comprising:
   calculating the first projection by calculating a first projection of a first three-dimensional VAR view based on the orientation and position of the device and the position of the first subframe on the single display;
   calculating the second projection by calculating a second projection of a second three-dimensional VAR view based on the orientation and the position of the device and the position of the second subframe on the single display, wherein:
   rendering the first VAR view comprises rendering the first three-dimensional VAR view with the first projection of the first three-dimensional VAR view within the first subframe of the single display; and
   rendering the second VAR view comprises rendering the second three-dimensional VAR view with the second projection of the second three-dimensional VAR view within the second subframe of the single display.

3. The method of claim 1, further comprising:
   calculating the first projection by calculating a first projection of a first VAR scene based on the orientation and position of the device and the position of the first subframe on the single display;
   calculating the second projection by calculating a second projection of a second VAR scene based on the orientation and position of the device and the position of the second subframe on the single display, wherein:
   rendering the first VAR view comprises rendering the first VAR scene with the first projection of the first VAR scene within the first subframe of the single display; and
   rendering the second VAR view comprises rendering the second VAR scene with the second projection of the second VAR scene within the second subframe of the single display.

4. The method of claim 1, further comprising:
   calculating the first projection by calculating a first projection of a first VAR view of a first spherical photograph based on the orientation and position of the device and the position of the first subframe on the single display;
   calculating the second projection by calculating a second projection of a second VAR view of a second spherical photograph based on the orientation and position of the device and the position of the second subframe on the single display, wherein:
   rendering the first VAR view comprises rendering the first VAR view of the first spherical photograph with the first projection of the first VAR view of the first spherical photograph within the first subframe of the single display; and
   rendering the second VAR view comprises rendering the second VAR view of the second spherical photograph of the second VAR view of the second spherical photograph with the second projection within the second subframe of the single display.

5. The method of claim 1, wherein the first projection differs from the second projection.

6. The method of claim 5, further comprising, before rendering the first VAR view and the second VAR view:
   determining the position of the first subframe within the single display; and
   determining the position of the second subframe within the single display.

7. The method of claim 1, further comprising, based on a user-measured input, enlarging a portion of the display of the first and second VAR views.

8. The method of claim 1, further comprising tracking a location of a user relative to the device, wherein simultaneously adjusting the display of the first and second VAR views is further based on the location of the user relative to the device.

9. The method of claim 8, wherein tracking the location of the user relative to the device comprises tracking the user's eyes relative to the device.

10. The method of claim 8, wherein tracking the location of the user relative to the device comprises tracking the user's head relative to the device.

11. A system comprising:
    at least one processor; and
    at least one non-transitory computer readable storage medium storing instructions that, when executed by the at least one processor, cause the system to:
    determine an orientation and position of a device based on sensor inputs;
    render a first virtual and augmented reality ("VAR") view with a first projection within a first subframe of a single display, wherein the first projection is based on the orientation and position of the device and a position of the first subframe on the single display;

render a second VAR view with a second projection within a second subframe of the single display, wherein the second projection is based on the orientation and position of the device and a position of the second subframe on the single display;

display the first and second VAR views simultaneously on the single display; and based on a change of the orientation and position of the device, simultaneously adjust the display of the first and second VAR views.

12. The system of claim 11, wherein the instructions that cause the system to determine the orientation and position of the device further comprise instructions that, when executed by the at least one processor, cause the system to determine the orientation and position of the device based on a rotation matrix that uses a gyroscope, a magnetometer, an accelerometer, or a combination thereof.

13. The system of claim 11, further comprising instructions that, when executed by the at least one processor, cause the system to:

replace the first projection with a static approximation of the first projection of the first VAR view; and replace the second projection with a static approximation of the second projection of the second VAR view.

14. The system of claim 11, wherein the first projection differs from the second projection.

15. The system of claim 14, further comprising instructions that, when executed by the at least one processor, cause the system to:

determines a position of the first subframe within the single display; and determines a position of the second subframe within the single display.

16. The system of claim 11, further comprising instructions that, when executed by the at least one processor, cause the system to, based on a user-measured input, enlarge a portion of the display of the first VAR view and the second VAR view.

17. The system of claim 11, further comprising instructions that, when executed by the at least one processor, cause the system to track a location of a user relative to the device;

wherein the instructions that cause the system to simultaneously adjust the display of the first VAR view and the second VAR view further comprises instructions that, when executed by the at least one processor, causes the system to simultaneously adjust the display of the first VAR view and the second VAR view further based on the location of the user relative to the device.

18. The system of claim 17, wherein the instructions that track the location of the user relative to the device further comprise instructions that, when executed by the at least one processor, track the user's eyes relative to the device.

19. The system of claim 17, wherein the instructions that track the location of the user relative to the device further comprise instructions that, when executed by the at least one processor, track the user's head relative to the device.

20. The system of claim 17, wherein the instructions that track the location of the user relative to the device further comprise instructions that, when executed by the at least one processor, track the location of the user relative to the device based on inputs from a proximity sensor.

* * * * *